US012735769B1

(12) United States Patent
Rehmat et al.

(10) Patent No.: US 12,735,769 B1
(45) Date of Patent: Sep. 15, 2026

(54) DEPLOYABLE MULTI-ZONE ROTARY-KILN SYSTEM AND METHOD FOR RECOVERY OF GALLIUM OXIDE FROM ELECTRONIC WASTE

(71) Applicant: Simple Approach Systems, Inc., Schaumburg, IL (US)

(72) Inventors: Amirali G. Rehmat, Hanover Park, IL (US); Renee L. Comly, Marshall, VA (US); Alex Mathew, Palatine, IL (US); Manpreet Kaur, Roselle, IL (US)

(73) Assignee: Simple Approach Systems, Inc., Schaumburg, IL (US)

( * ) Notice: Subject to any disclaimer, the term of this patent is extended or adjusted under 35 U.S.C. 154(b) by 0 days.

(21) Appl. No.: 19/412,184

(22) Filed: Dec. 8, 2025

(51) Int. Cl.
*C22B 58/00* (2006.01)
*B09B 3/35* (2022.01)
(Continued)

(52) U.S. Cl.
CPC ................ *C22B 58/00* (2013.01); *B09B 3/35* (2022.01); *B09B 3/40* (2022.01); *C22B 7/007* (2013.01);
(Continued)

(58) Field of Classification Search
None
See application file for complete search history.

(56) References Cited

U.S. PATENT DOCUMENTS 5,005,493 A 4/1991 Gitman
5,207,176 A 5/1993 Morhard
(Continued)

FOREIGN PATENT DOCUMENTS

CN 102951618 B 7/2014
CN 113621814 A * 11/2021 .............. C25C 1/22
(Continued)

OTHER PUBLICATIONS

Maarefvand et al (âRecovery of gallium from waste LEDs by oxidation and subsequent leachingâ, Hydrometallurgy 191 (2020) 105230, pp. 1-10). (Year: 2020).*
(Continued)

*Primary Examiner* — Michael Forrest
(74) *Attorney, Agent, or Firm* — FisherBroyles, LLP; Joseph Hyosuk Kim

(57) ABSTRACT

A deployable system and method are provided for recovering gallium oxide from gallium-nitride-bearing electronic waste in a single, continuous, multi-zone rotary-kiln reactor. Shredded E-Waste is introduced through a sealed feed assembly into a refractory-lined kiln having a first zone operating at about 700° C.-900° C. for partial oxidation of organics and a second zone operating at about 1000° C.-1200° C. for oxidation of gallium nitride to gallium oxide. Controlled oxidant injection and kiln rotation of 0.25-3 rpm maintains residence times of 0.5-2 hours for complete conversion. An expanded velocity-reduction chamber separates oxidized solids from gases, while a downstream heat-recovery and dry-neutralization system removes acid gases and volatile metals without producing liquid effluent. The resulting porous gallium oxide is directly leachable to yield high-purity gallium. The modular, containerized design allows field deployment and scalability, and may also recover indium, tin, cobalt, lithium, and rare-earth oxides from other composite electronic wastes.

24 Claims, 5 Drawing Sheets

(51) Int. Cl.

| | |
|---|---|
| ***B09B 3/40*** | (2022.01) |
| ***C22B 7/00*** | (2006.01) |
| ***F27B 7/02*** | (2006.01) |
| ***F27B 7/06*** | (2006.01) |
| ***F27B 7/14*** | (2006.01) |
| ***F27B 7/26*** | (2006.01) |
| ***F27B 7/38*** | (2006.01) |
| ***F27B 7/42*** | (2006.01) |

(52) U.S. Cl.

CPC .................. *F27B 7/02* (2013.01); *F27B 7/06* (2013.01); *F27B 7/14* (2013.01); *F27B 7/26* (2013.01); *F27B 7/383* (2013.01); *F27B 7/42* (2013.01)

(56) References Cited

U.S. PATENT DOCUMENTS

| | | | | |
|---|---|---|---|---|
| 6,932,002 B2 * | 8/2005 | May | ........................ | F23G 5/006 110/215 |
| 2022/0115718 A1 * | 4/2022 | Yue | ........................ | H01M 4/131 |

FOREIGN PATENT DOCUMENTS

| | | | | |
|---|---|---|---|---|
| CN | 120119101 A * | 6/2025 | ............. | B03C 1/015 |
| EP | 0271845 B1 | 7/1991 | | |
| JP | 2605034 B2 | 4/1997 | | |
| KR | 101539431 B1 | 7/2015 | | |
| KR | 101567499 B1 | 11/2015 | | |
| KR | 20170019246 A | 2/2017 | | |
| WO | 9107127 | 5/1991 | | |
| WO | 2024129241 A2 | 6/2024 | | |

OTHER PUBLICATIONS

Machine Translation of CN-120119101-A (Year: 2025).*

Machine Translation for CN-113621814 (Year: 2021).*

Maarefvand, M., S. Sheibani, and F. Rashchi. “Recovery of gallium from waste LEDs by oxidation and subsequent leaching.” Hydrometallurgy 191 (2020): 105230.

Nishinaka, Kazuki, et al. “Pyrometallurgical recovery of gallium from GaN semiconductor through chlorination process utilizing ammonium chloride.” Materials Transactions 58.4 (2017): 688-691.

Swain, Basudev, et al. “Recycling process for recovery of gallium from GaN an e-waste of LED industry through ball milling, annealing and leaching.” Environmental research 138 (2015): 401-408.

Zhou, Jiazhi, et al. “Recovery of gallium from waste light emitting diodes by oxalic acidic leaching.” Resources, Conservation and Recycling 146 (2019): 366-372.

* cited by examiner

DEPLOYABLE MULTI-ZONE ROTARY-KILN SYSTEM AND METHOD FOR RECOVERY OF GALLIUM OXIDE FROM ELECTRONIC WASTE

FIELD OF INVENTION

The present invention relates generally to systems and processes for the thermal and chemical recovery of critical and strategic metals from composite electronic waste (E-Waste). More particularly, the invention concerns a deployable, multi-zone rotary-kiln reactor and associated method for the simultaneous destruction of organic constituents and oxidation of gallium nitride (GaN) to gallium oxide ($Ga_2O_3$) in a single continuous operation. The invention further relates to modular and scalable implementations of such systems for distributed or industrial-scale recovery of gallium, indium, tin, lithium, cobalt, and rare-earth elements from semiconductor, lighting, and electronic components.

GENERAL BACKGROUND AND THE STATE OF ART

Gallium nitride (GaN)-based semiconductors have become indispensable in modern electronics, powering devices such as LEDs, laser diodes, radar modules, and high-frequency communication systems. Their exceptional electronic and thermal properties have made GaN the preferred material for high-efficiency power conversion, 5G/6G telecommunications, and defense electronics. However, the same chemical stability that gives GaN its desirable performance also makes its recovery and recycling extremely challenging. When incorporated into electronic waste (E-Waste), GaN is typically embedded within composite structures containing metals, ceramics, adhesives, and polymeric encapsulants such as epoxy resins. The difficulty of selectively oxidizing GaN and removing these organics has hindered the establishment of cost-effective domestic supply chains for gallium, a critical material whose global production remains concentrated in a few foreign sources.

The established methods for recovering gallium from end-of-life electronics or manufacturing residues rely on multiple, sequential processes. Early chemical routes, such as those disclosed in European Patent EP0271845B1, involve chlorination of gallium-bearing materials with hydrogen chloride to produce gallium trichloride ($GaCl_3$) gas. Japanese Patent JP2605034B2 describes vacuum pyrolysis for recovering metallic gallium from alloy residues under reduced pressure. These approaches are inherently batch-based, generate corrosive or toxic by-products, and are unsuitable for complex E-Waste mixtures containing high levels of organic materials. They do not provide a means to directly convert GaN to a recoverable oxide form or to eliminate organic binders in a single operation.

More recent developments in the field, including Chinese Patent CN102951618B and Korean Patents KR101567499B1 and KR20170019246A, attempt to recover gallium and indium from light-emitting diode (LED) wastes through a combination of crushing, solvent cleaning, and acid leaching. These processes emphasize selective metal extraction but depend on extensive preprocessing to remove polymers and expose GaN chips. Other Korean filings such as KR101539431B1 focus on the recovery of gallium from chemical vapor deposition (MOCVD) waste dusts through high-temperature calcination and electrochemical treatment, targeting homogeneous fine powders rather than heterogeneous E-Waste. In all these cases, the oxidation of GaN, if performed, occurs as a separate stage after mechanical or chemical removal of organics, requiring multiple reactors or treatment steps.

Academic studies have explored thermochemical oxidation of GaN as a preparatory step for hydrometallurgical recovery. Researchers such as Zhou et al. (Chemical Engineering Journal, 2019) and Maarefvand et al. (Chemosphere, 2020) reported heating waste LEDs at approximately 1100° C. to convert GaN to gallium oxide ($Ga_2O_3$), followed by hydrochloric acid leaching to extract gallium. Although these studies confirm that $Ga_2O_3$ is more readily leachable than GaN, they still employ sequential operations: organic encapsulants are first burned or dissolved, and the remaining GaN is oxidized in a separate furnace. Swain et al. (Waste Management, 2015) describe a similar multistage process of disassembly, annealing, acid leaching, and solvent extraction. None of these investigations disclose a continuous, single-reactor system capable of simultaneously destroying organics and oxidizing GaN under controlled residence-time and temperature conditions.

Alternative routes have also been proposed. Nishinaka et al. (Materials Transactions, 2017) convert GaN to volatile $GaCl_3$ using ammonium chloride vapor at moderate temperatures. While effective chemically, chlorination generates corrosive gases and requires multiple containment systems. Other emerging methods, such as those described in WIPO publication WO2024129241A2, employ microwave-assisted pyrolysis to liberate metals from E-Waste. These techniques can decompose organics but lack the chemical specificity and temperature zoning necessary to transform GaN into porous $Ga_2O_3$ suitable for efficient leaching. None combines organic removal and GaN oxidation in a single controlled environment.

Rotary-kiln and multi-zone incineration technologies have existed for decades in the field of hazardous-waste management. Patents such as U.S. Pat. No. 5,005,493A, 5,207,176A, and WO91/07127 disclose rotary-kiln systems with multiple thermal sections and staged air injection designed to destroy hazardous organics. These designs demonstrate the mechanical feasibility of operating multiple temperature zones within a rotating drum. However, they are intended for waste destruction rather than materials recovery, do not involve gallium-containing feedstocks, and make no mention of maintaining oxide porosity or chemical composition for subsequent leaching. Moreover, their large scale and environmental focus render them unsuitable for deployable or modular use near the point of E-Waste generation.

The scientific and patent literature therefore reveals that all known methods for gallium recovery from GaN-bearing E-Wastes are characterized by multi-step processing, solvent-intensive pretreatment, and incomplete integration of organic removal and GaN oxidation. Despite extensive research on gallium recycling, no disclosure has been found that teaches a single continuous system capable of simultaneously oxidizing organic polymers and converting GaN to porous $Ga_2O_3$ under controlled conditions. None address the importance of preserving or tailoring oxide porosity to enhance leaching kinetics, nor do they propose a compact, containerized configuration suitable for distributed or on-base operations.

The present invention addresses these deficiencies through an integrated multi-zone rotary-kiln system that performs both organic destruction and GaN oxidation within a single reactor. A first thermal zone maintained at approximately 700-900° C. eliminates organics, while a second zone operating at approximately 1000-1200° C. converts GaN to porous $Ga_2O_3$ with engineered residence time and gas-flow control. The resulting product is directly leach-ready, enabling high gallium recovery without the use of solvents or separate oxidation furnaces. This configuration, combined with its compact and deployable design, distinguishes the invention from all prior art identified in global patent and scientific literature and establishes a clear inventive step in the field of critical-material recovery from electronic waste.

SUMMARY OF THE INVENTION

The present invention relates to a deployable system and method for recovering gallium from gallium-nitride-bearing electronic waste in a single, continuous, multi-zone rotary-kiln reactor. The invention provides an integrated apparatus in which both destruction of organic materials and oxidation of gallium nitride occur within distinct but contiguous temperature zones of the same reactor under controlled oxidant supply and residence-time conditions. In operation, shredded electronic waste containing gallium nitride, polymers, and metallic components is introduced through a sealed feed assembly into a refractory-lined rotary kiln that is divided functionally into a first, lower-temperature organic-oxidation zone and a second, higher-temperature gallium-oxidation zone. The first zone operates at approximately 700° C. to 900° C. and effects partial oxidation of organics using sub-stoichiometric air, oxygen-enriched air, or a controlled oxygen-flue-gas mixture, thereby converting carbonaceous matter to gaseous products while liberating embedded metals and ceramics. The second zone operates at approximately 1000° C. to 1200° C. and converts gallium nitride to porous gallium oxide ($Ga_2O_3$) according to the reaction $2\ GaN+3\ O_2 \rightarrow 2\ Ga_2O_3+2\ N_2$. Oxidant is introduced through a distributed manifold or nozzle assembly that provides staged injection in either co-flow or counter-flow configuration relative to solids motion. The kiln rotates at controlled speed between about 0.25 and 3 revolutions per minute to maintain solids residence time of 0.5 to 2 hours, thereby ensuring complete oxidation while preventing sintering of the oxide product. Downstream of the oxidation zone, an expanded velocity-reduction chamber reduces gas velocity below the terminal settling velocity of metallic oxides, allowing separation and collection of oxidized solids on a moving grate and their discharge to a cooled hopper. The off-gases pass through an integrated heat-recovery exchanger that generates steam, followed by a dry lime-injection neutralization section and bag-filter unit that remove acid gases and volatile metals without producing liquid effluent. The porous gallium oxide product obtained is directly suitable for acid leaching, for example with hydrochloric acid at 70° C. to 90° C., to yield soluble gallium chloride which may then be purified by solvent extraction, ion exchange, or electrowinning to obtain high-purity metallic gallium. The entire assembly can be housed within an ISO or CONEX transportable enclosure, forming a modular system capable of processing one to five tons of E-Waste per day per module, with multiple modules operable in parallel for larger throughput. The invention eliminates the need for solvent pretreatment or separate oxidation furnaces, reduces operational complexity and energy consumption, and achieves complete destruction of organic residues while producing a clean, leach-ready oxide product. By adjusting temperature zoning, oxidant distribution, and residence time, the same reactor architecture may also be applied to recover other critical or strategic materials such as indium, tin, cobalt, lithium, and rare-earth elements from composite electronic wastes. Through this integrated multi-zone thermal-oxidation design, the invention provides a compact, energy-efficient, and environmentally compliant platform for distributed recovery of gallium and other valuable metals from complex electronic waste streams.

The system architecture is inherently scalable from pilot to industrial capacities exceeding 100 tons per day without modification of the underlying thermochemical principles."

All figures are provided for illustrative purposes only and are not drawn to scale.

DETAILED DESCRIPTION OF THE PREFERRED EMBODIMENTS

The present invention provides a system and method for recovering gallium from gallium-nitride-bearing electronic waste using a single, continuous, multi-zone rotary-kiln reactor. The invention integrates, within one apparatus, two thermally independent reaction environments: a lower-temperature region for oxidation of organic constituents and a higher-temperature region for controlled oxidation of gallium nitride (GaN) to porous gallium oxide ($Ga_2O_3$). The resulting oxide is directly suitable for subsequent acid leaching to yield high-purity metallic gallium.

Figure 1:
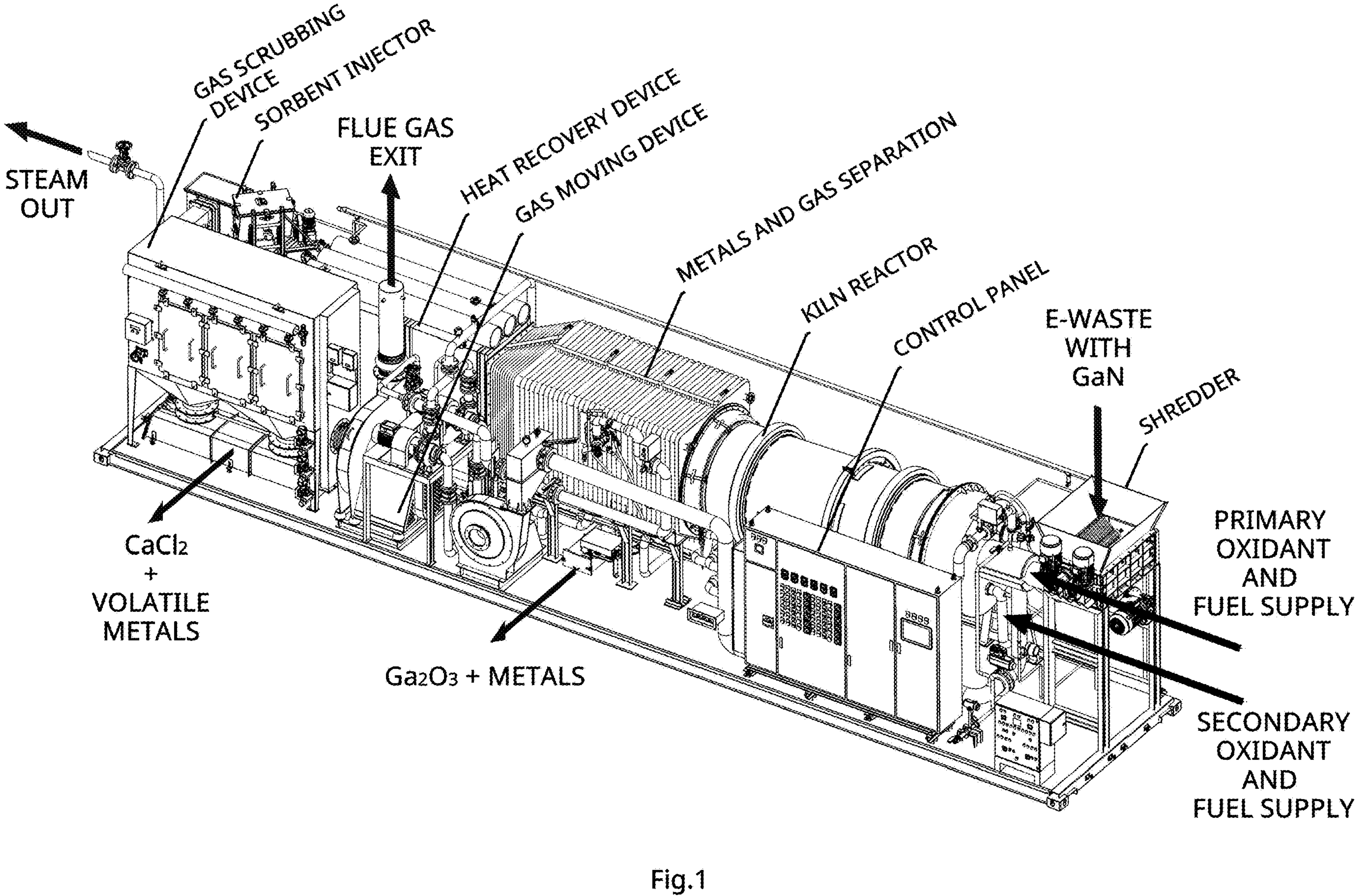
FIG. 1 depicts the components and general assembly of the deployable system for the recovery of gallium oxide ($Ga_2O_3$) from E-Waste.

As schematically shown in FIG. 1, the invention includes a complete assembly for an expeditionary thermal-conversion system configured to receive and process E-Waste containing GaN-bearing components such as semiconductor chips, LED light sources, and display elements. The integrated structure incorporates feed preparation, rotary-kiln conversion, oxidized-metal removal, heat recovery, acid-gas neutralization, and volatile-metal capture within a single modular unit.

Figure 2:
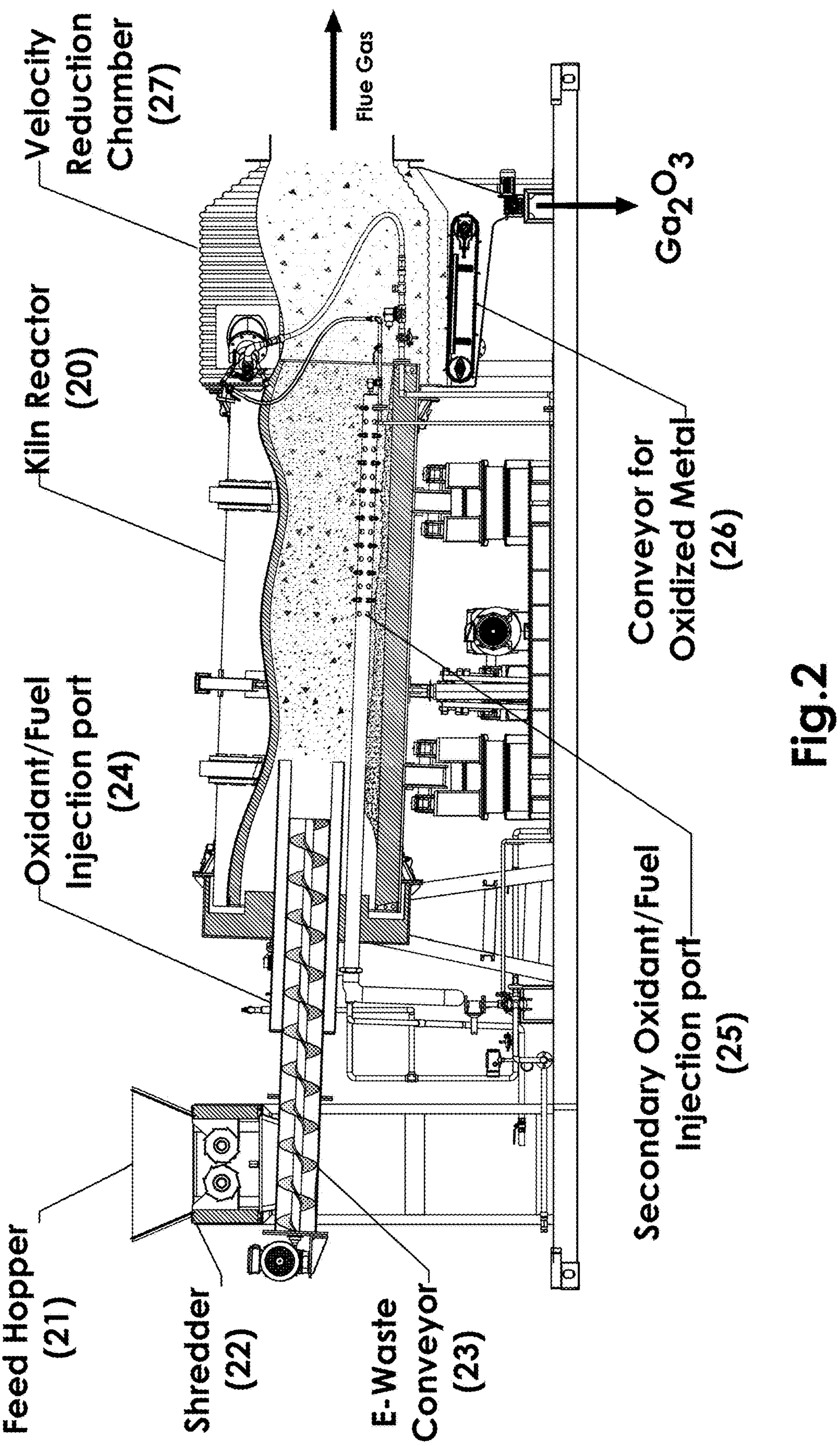
FIG. 2 is a cross-sectional view of the reactor assembly illustrating the internal distribution of oxidant and fuel nozzles for partial oxidation of organic materials, oxidation of GaN to $Ga_2O_3$, and discharge mechanisms for oxidized gallium and other metals present in the E-Waste.

Referring to FIG. 2, the reactor comprises a refractory-lined, horizontally oriented rotary kiln (20) divided into two primary reaction zones arranged in series along the direction of solids flow. The kiln is mounted on rollers, rotated by a variable-speed drive, and enclosed within a sealed housing to maintain controlled atmospheres in each region. E-Waste feedstock is introduced through a hopper (21) equipped with a shredder (22), an airlock, and a metering device that ensures steady feed delivery while preventing uncontrolled air ingress. The shredded waste is conveyed into the rotary kiln (20) by a screw conveyor (23). Oxidant and, when required, auxiliary fuel are injected through an annular passage (24) surrounding the waste feeder, the annulus extending beyond the feed entry point to provide for partial combustion of organics present in the waste. The kiln discharges into an expanded velocity-reduction chamber (27) that reduces gas velocity to below the terminal settling velocity of the metal particles, allowing separation of the metal particles from the gas stream. A moving grate (26) facilitates continuous withdrawal of oxidized metals from the system.

Figure 3:
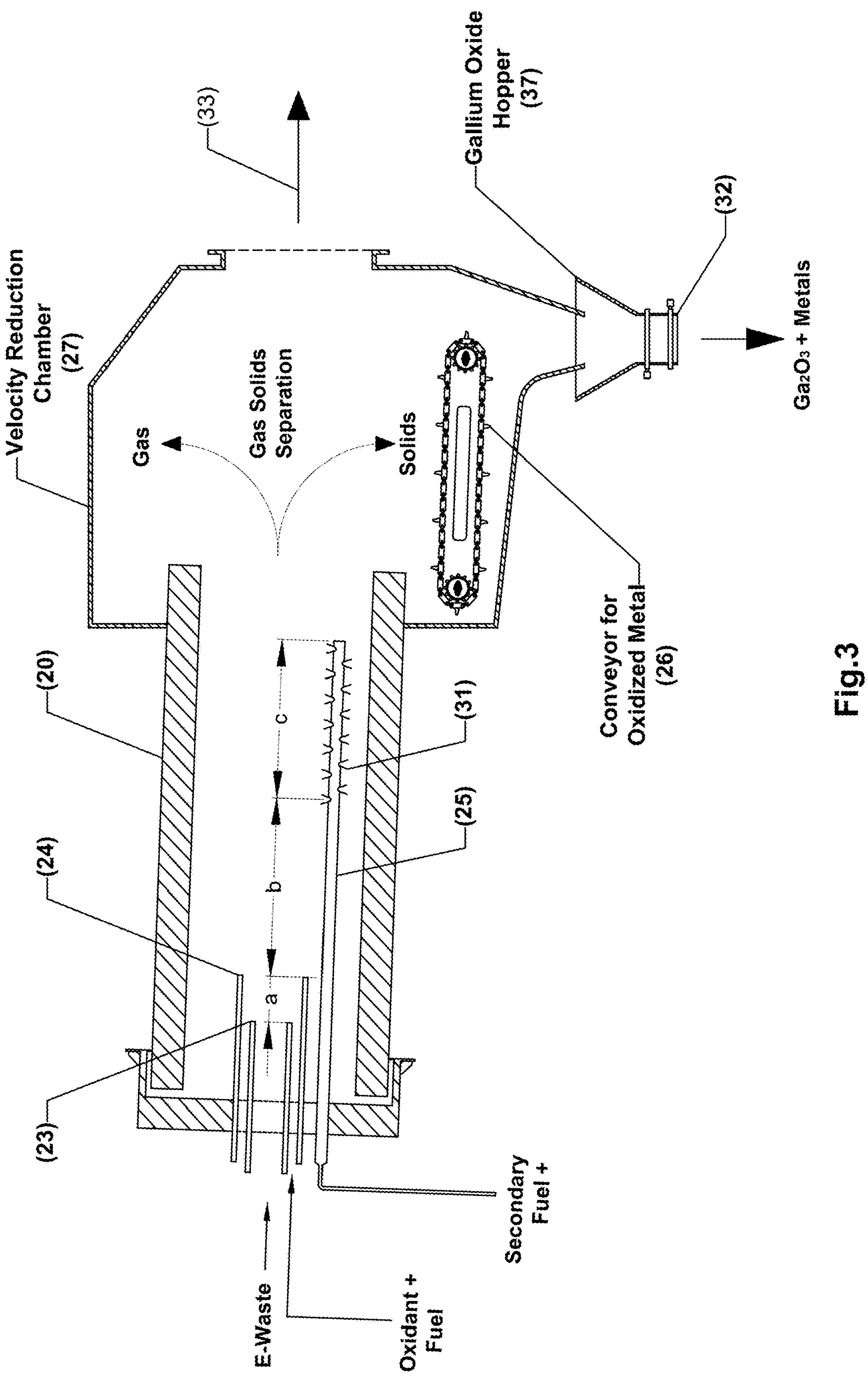
FIG. 3 shows the internal nozzle and feed assemblies of the rotary-kiln reactor, depicting the relative arrangement of the E-Waste feed inlet, oxidant and fuel injection nozzles, and mechanisms for removal of oxidized gallium and other metal oxides.

As illustrated in FIG. 3, the feed nozzle and the oxidant and fuel nozzles are arranged concentrically so that the annular oxidant manifold extends approximately six to twelve inches beyond the E-Waste entry point, identified as dimension "a," to ensure ignition and partial oxidation of organic constituents. Downstream of this region, secondary oxidant is introduced into the kiln through conduit (25) after sufficient residence time has been provided for organics to volatilize and for metals to separate from gases. This residence region, designated as dimension "b," generally represents about one-third of the total kiln length. Oxidation air is supplied to the metallic residue through nozzles (31) distributed along conduit (25). The conduit is sealed at its far end to achieve uniform oxidant distribution within the kiln and to provide adequate exposure to the metal surfaces. The section of the kiln devoted to complete oxidation of metals and GaN to their oxides, designated as dimension "c," comprises typically fifty to seventy-five percent of the kiln length. The kiln rotation speed, maintained between about 0.25 and 3 revolutions per minute, affords control over the residence time and reaction exposure. Residence time for metal oxidation typically ranges from thirty minutes to two hours. The oxidized metals and $Ga_2O_3$ are discharged into the velocity-reduction chamber (27), where gases are decelerated and separated from the solid product. The solids are conveyed by the oxidized-metal conveyor (26) to the metal-oxide hopper (32) and exit port (33), while process gases leave the kiln through conduit (33) for cooling, neutralization, and particulate removal.

Figure 4:
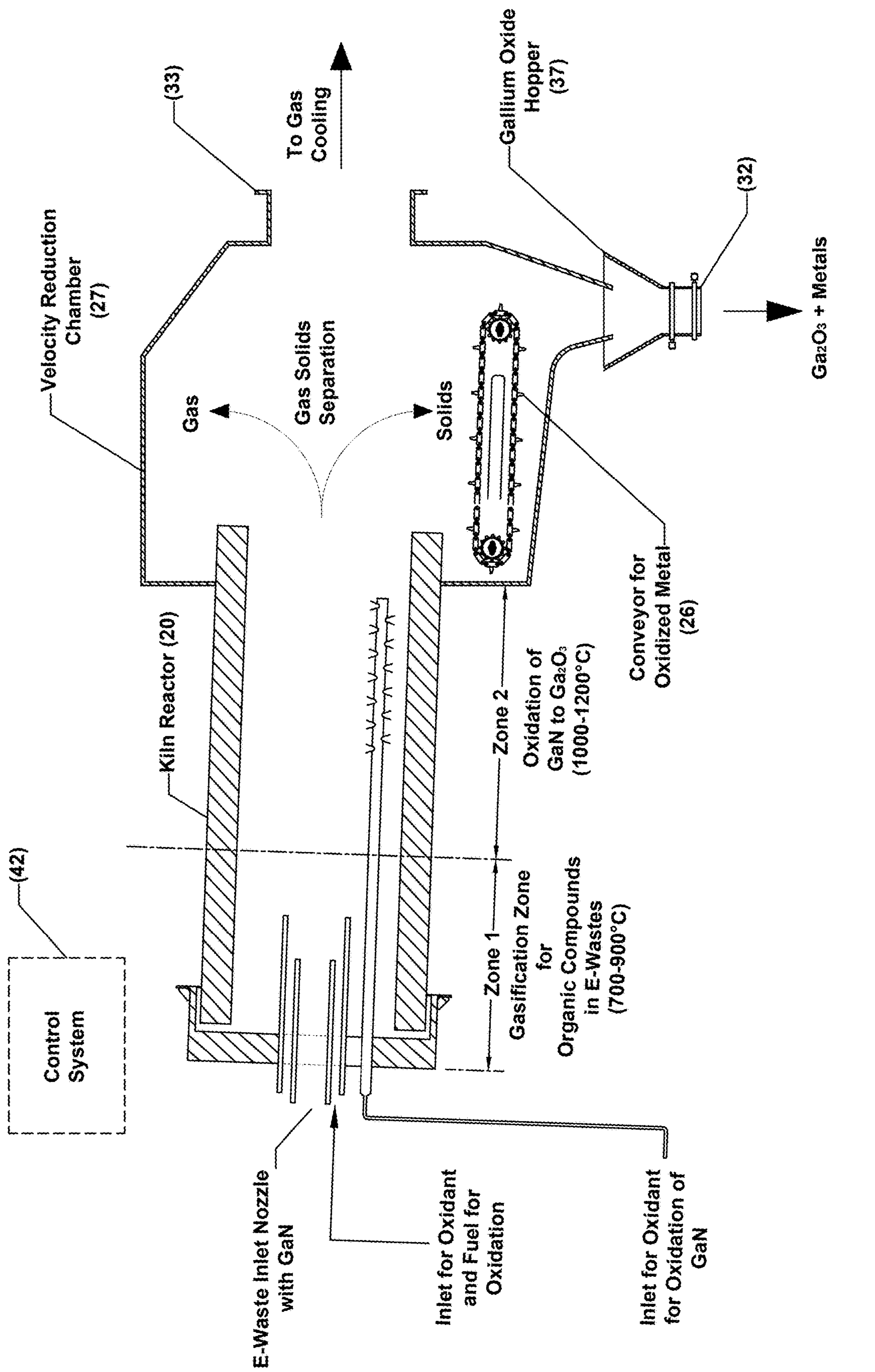
FIG. 4 illustrates the relative entry points of E-Waste and oxidant for sub-stoichiometric combustion of organics, the introduction of oxidant for GaN oxidation, the gallium-oxide discharge mechanism, and an expanded reactor section for metal discharge.

FIG. 4 illustrates the thermal interactions between the principal reaction zones within the kiln. A first thermal region, or organic-destruction zone, operates at approximately 700° C. to 900° C. under oxidizing conditions. In this region, epoxy resins, encapsulants, adhesives, and other polymeric materials associated with the electronic components are decomposed and oxidized. The oxidant may be air, oxygen-enriched air, or a controlled mixture of oxygen and recycled flue gas to moderate temperature rise. The partial oxidation of these organics produces gases predominantly containing $CO_2$, $H_2O$, and light hydrocarbons, which subsequently pass into the second thermal zone where they are completely combusted before discharge.

The second thermal region, or gallium-oxidation zone, operates at a temperature typically between 1000° C. and 1200° C., under conditions effective to convert gallium nitride into gallium oxide according to the reaction

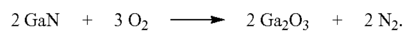

$$2\,GaN + 3\,O_2 \longrightarrow 2\,Ga_2O_3 + 2\,N_2.$$

The residence time of solids in this region ranges from about 0.5 to 2 hours, preferably about one hour, thereby achieving complete conversion without sintering of the oxide product. Oxidant is distributed by a staged-injection manifold that may deliver either co-flow or counter-flow gas relative to the solid's movement. Temperature control is maintained independently through zoned external burners or electric heating elements, with continuous monitoring by thermocouples or optical pyrometers. The transition between the first and second zones may include an inter-zone seal or baffle to minimize gas cross-contamination while allowing smooth transfer of solids. Internal lifters and baffles ensure uniform heating and prevent stagnation.

During operation, polymeric constituents are completely destroyed in the first zone, leaving an inorganic matrix that enters the second zone free of carbonaceous residue. Within the oxidation region, GaN reacts with oxygen under diffusion-controlled conditions to form porous $Ga_2O_3$. Gas composition, temperature profile, and residence time are controlled to produce an oxide with a surface area between about 5 and 50 $m^2$ per gram, which is optimal for subsequent leaching. The oxidized solids are discharged via the conveyor (26) into the hopper (32) and lock (33) and are collected in a cooling chamber. After cooling, the solids may be subjected to magnetic or density separation to remove residual metallic particles before leaching.

The porous gallium oxide formed by this process is readily soluble in mineral acids. In one representative embodiment the oxide is leached with hydrochloric acid at 70° C. to 90° C. and ambient pressure to form gallium chloride in solution. The resulting liquor is filtered and purified by solvent extraction, ion exchange, or electrowinning to yield high-purity metallic gallium. Because of the oxide's high surface area, leaching proceeds rapidly and allows near-complete gallium recovery under mild conditions.

Figure 5:
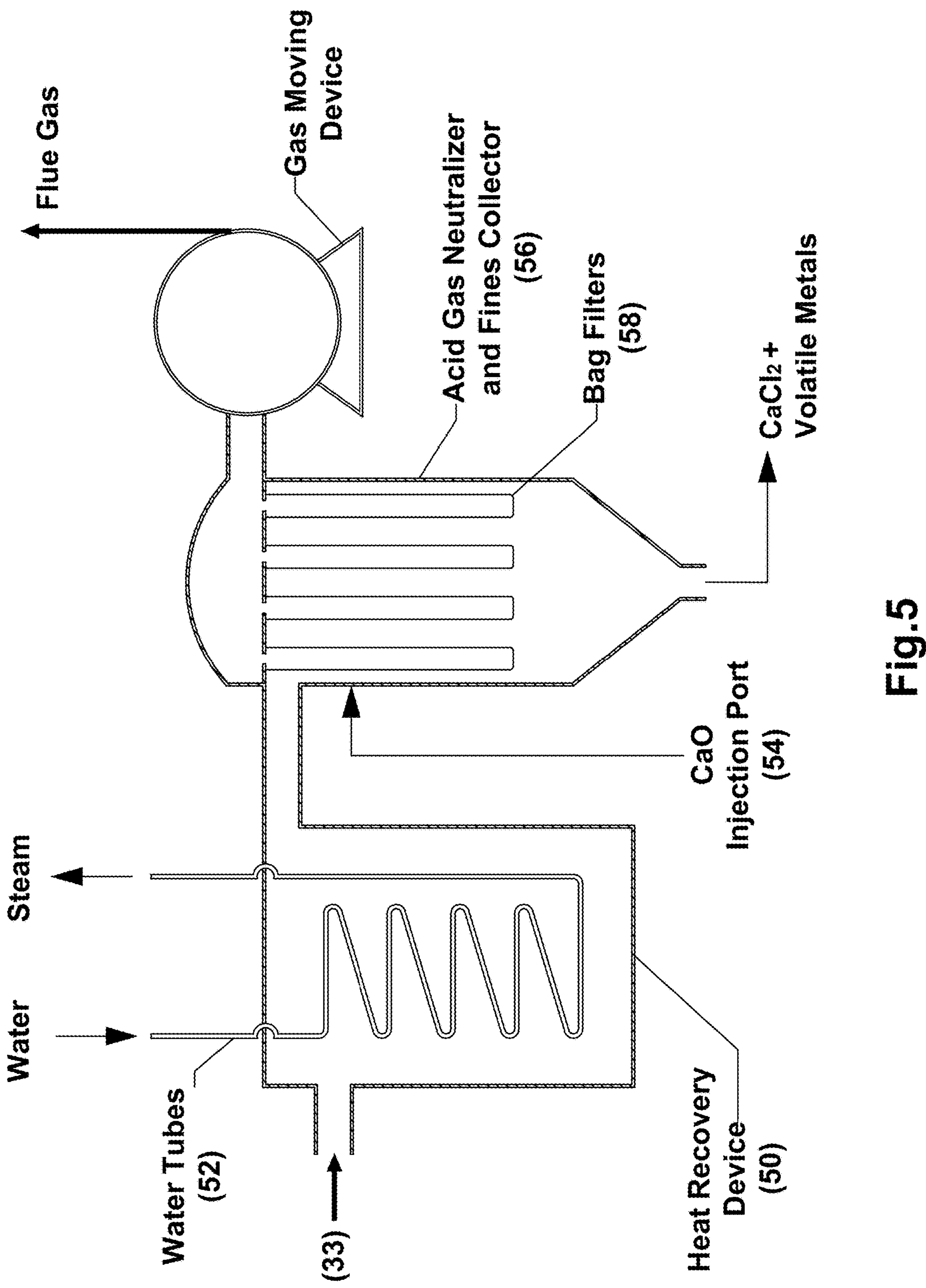
FIG. 5 illustrates integrated downstream zones for heat recovery, gas neutralization, and removal of stable and volatile compounds produced from E-Waste processing.

Referring now to FIG. 5, the gaseous effluent from the velocity-reduction chamber (27) passes through a heat-recovery exchanger (50) containing water tubes (52) that generate steam from the recovered heat. The partially cooled gas then receives powdered lime (CaO) through injection ports (54) at a temperature between about 350° F. and 600° F. Neutralization and particulate capture occur in an acid-gas neutralizer and bag-filter assembly (56, 58) according to the reactions

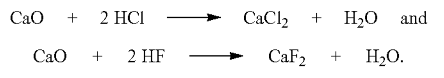

$$CaO + 2\,HCl \longrightarrow CaCl_2 + H_2O \quad \text{and}$$

$$CaO + 2\,HF \longrightarrow CaF_2 + H_2O.$$

The solid reaction products are collected in the filters, producing no liquid effluent. Any volatile metals are condensed and trapped simultaneously. The recovered heat may be used to preheat incoming oxidant or feed or to generate auxiliary power, thereby improving overall energy efficiency.

The system is housed within a modular enclosure such as an ISO or CONEX container, enabling transportable operation. Each containerized module can process approximately one to five tons of E-Waste per day, permitting deployment at military installations, recycling centers, or industrial sites. Multiple units can be operated in parallel to increase throughput. Bench-scale versions handling 5 to 25 kilograms per hour, pilot systems handling 0.5 to 1 ton per day, and full-scale units handling 1 to 5 tons per day can be constructed while maintaining equivalent temperature and residence-time ratios.

In other embodiments, the same design architecture can be scaled to industrial or regional installations without inherent upper limit. Larger rotary kilns may be constructed by proportional enlargement of reactor diameter, length, slope, and drive power while maintaining equivalent thermal gradients, residence-time ratios, and oxidant-distribution geometry. Throughput can thus extend well beyond five tons per day per reactor-ranging from pilot demonstration to industrial systems exceeding one hundred tons per day-without altering the underlying thermochemical conversion methodology. Alternatively, multiple modular reactors may be operated in parallel or in series to achieve higher cumulative capacity or statewide processing capability while preserving process control and conversion efficiency.

Although the invention is exemplified for gallium recovery from GaN-based E-Waste, the same multi-zone oxidation principle can be applied to recover other valuable materials such as indium and tin from indium-tin-oxide coatings, cobalt and lithium from battery cathodes, and rare-earth elements from magnet assemblies. Adjustment of temperature zoning, gas composition, and residence time allows tuning of the reactor for these additional applications.

The invention offers several advantages over prior art. It eliminates solvent pre-treatment and separate oxidation furnaces, reduces operational complexity and energy consumption, produces a clean solid output suitable for direct leaching, and achieves complete destruction of organic residues without generating secondary liquid wastes. Through its integrated multi-zone design, the invention provides a compact, deployable, and environmentally compliant system for recovering gallium and other critical materials from complex electronic waste streams efficiently and sustainably.

REFERENCES CITED

Patent Documents

1. EP0271845B1—Process for the production of gallium trichloride and gallium metal, European Patent Office, issued Jun. 22, 1988.
2. JP2605034B2—Method for recovering metallic gallium from alloy residues under vacuum conditions, Japan Patent Office, issued May 17, 1997.
3. CN102951618B—Method for recovering gallium and indium from LED waste, State Intellectual Property Office of China, issued Aug. 13, 2015.
4. KR101567499B1—Recovery of gallium and indium from waste light-emitting diodes (LEDs), Korean Intellectual Property Office, issued Nov. 16, 2015.
5. KR20170019246A—Process for metal recovery from LED waste by combined crushing and solvent treatment, Korean Intellectual Property Office, published Feb. 17, 2017.
6. KR101539431B1—Recovery of gallium from MOCVD process dusts via calcination and electrochemical treatment, Korean Intellectual Property Office, issued Jul. 20, 2015.
7. U.S. Pat. No. 5,005,493A—Rotary kiln system for hazardous-waste incineration with staged air injection, United States Patent and Trademark Office, issued Apr. 9, 1991.
8. U.S. Pat. No. 5,207,176A—Multi-zone rotary-kiln incinerator with temperature-controlled sections, United States Patent and Trademark Office, issued May 4, 1993.
9. WO91/07127—Rotary-kiln waste-destruction apparatus having multiple air-injection zones, World Intellectual Property Organization, published May 23, 1991.
10. WO2024129241A2—Microwave-assisted pyrolysis process for metal recovery from electronic waste, World Intellectual Property Organization, published Jun. 27, 2024.

Non-Patent Literature

1. Zhou, J. et al., Recovery of gallium from waste light emitting diodes by oxalic acidic leaching, *Resources, Conservation & Recycling*, Vol. 146, 2019, pp. 366-372.
2. Maarefvand, M. et al., Recovery of gallium from waste LEDs by oxidation and subsequent leaching, *Hydrometallurgy*, Vol. 191, 2020, p. 105230.
3. Swain, B. et al., Recycling process for recovery of gallium from GaN, an e-waste of LED industry, through ball milling, annealing and leaching, *Environmental Research*, Vol. 138, 2015, pp. 401-408.
4. Nishinaka, K. et al., Pyrometallurgical recovery of gallium from GaN semiconductor through chlorination process utilizing ammonium chloride, *Materials Transactions*, Vol. 58, 2017, pp. 688-691.

All patents and publications cited herein are incorporated by reference in their entirety.

Having thus described the invention, what is claimed is:

1. A method for recovering gallium oxide from electronic waste containing gallium nitride, comprising the steps of:

a) shredding and metering the electronic waste to form a controlled feed;

b) introducing the feed into a rotary-kiln reactor under conditions of limited oxidant supply to effect partial oxidation of organic constituents at a temperature between about 700° C. and 900° C., thereby leaving an inorganic residue;

c) transferring the inorganic residue to a higher-temperature zone of the same reactor and introducing oxidant to oxidize gallium nitride to gallium oxide at a temperature between about 1000° C. and 1200° C.;

d) rotating the reactor at a rate between about 0.25 rpm and 3 rpm to control the residence time of solids between about 0.5 hour and 2 hours;

e) discharging the oxidized solids into a velocity-reduction chamber to separate metals from process gases;

f) collecting the gallium-oxide-containing solids and cooling them to ambient temperature; and g) subjecting the cooled solids to acid leaching to produce a soluble gallium salt suitable for recovery of metallic gallium.

2. The method of claim 1, wherein the oxidant for step (b) is supplied at sub-stoichiometric levels to ensure partial oxidation and controlled temperature.

3. The method of claim 1, wherein the oxidation of gallium nitride in step (c) proceeds according to 2 GaN+3 $O_2$→2 $Ga_2O_3$+2 $N_2$.

4. The method of claim 1, wherein the gallium oxide has a surface area between about 5 $m^2/g$ and 50 $m^2/g$.

5. The method of claim 1, wherein the leaching step (g) comprises contacting the gallium oxide with hydrochloric acid at a temperature between about 70° C. and 90° C. under ambient pressure to yield gallium chloride solution.

6. The method of claim 5, wherein the gallium chloride solution produced in step (g) is purified by solvent extraction, ion exchange, or electrowinning to recover metallic gallium of at least 99.99 percent purity.

7. The method of claim 1, wherein heat recovered from flue gases produced during the process is utilized to preheat incoming oxidant or to generate steam or electricity.

8. The method of claim 1, wherein the electronic waste containing gallium nitride further contains one or more of indium, tin, cobalt, lithium, or rare-earth elements and temperature zoning and gas composition are adjusted to effect oxidation of gallium nitride and such additional metals to recoverable oxides.

9. The method of claim 1, wherein oxidant injection in step (c) is performed in a staged co-flow or counter-flow configuration.

10. The method of claim 1, further comprising pre-reducing selected metallic oxides under slightly reducing conditions in step (b) prior to oxidation in step (c).

11. The method of claim 1, wherein the electronic waste containing gallium nitride further comprises indium-tin-oxide coatings, and the second reaction zone converts gallium nitride to gallium oxide and converts indium and tin to indium oxide and tin oxide.

12. The method of claim 1, wherein the electronic waste containing gallium nitride further comprises cathode materials from lithium-ion batteries, and the second reaction zone containing gallium nitride converts cobalt, nickel, or lithium compounds to corresponding oxides.

13. The method of claim 1, wherein the electronic waste containing gallium nitride further comprises magnet assemblies containing rare-earth elements, and the process recovers gallium oxide and rare-earth oxides selected from neodymium oxide, dysprosium oxide, and praseodymium oxide.

14. The method of claim 1, wherein temperature zoning, oxidant distribution, and residence time are selectively adjusted to accommodate feed compositions containing gallium nitride and additionally containing one or more of combinations of gallium, indium, tin, cobalt, or lithium compounds.

15. The method of claim 1, wherein oxidant injection in step (c) is performed in a staged sequence using co-flow and counter-flow configurations to optimize conversion efficiency.

16. The method of claim 1, wherein the oxidant for step (b) is introduced under reducing conditions to pre-reduce metallic oxides before full oxidation in step (c).

17. The method of claim 1, further comprising separating residual metallic particles from the oxidized product by magnetic or density separation before the leaching step.

18. The method of claim 1, wherein the gallium oxide generated in step (c) is porous gallium oxide.

19. The method of claim 18, wherein the gallium oxide product exhibits a surface area between about 5 and 50 $m^2/g$, facilitating leaching under mild conditions.

20. The method of claim 1, wherein continuous monitoring of flue-gas composition ensures complete oxidation of organics and compliance with emission standards.

21. The method of claim 1, wherein the electronic waste containing gallium nitride further comprises semiconductors, magnets, or conductive coatings and the process recovers gallium oxide and additional critical or strategic elements through controlled multi-zone oxidation.

22. The method of claim 1, wherein gallium oxide and additional metal oxides recovered in step (f) are subsequently leached and purified to yield metallic gallium and additionally metallic forms of one or more of indium, tin, cobalt, lithium, or rare-earth metals.

23. The method of claim 1, wherein steps (b) through (g) are conducted within a plurality of reactors operating concurrently, each reactor corresponding to a module processing between one and five tons of electronic waste per day, the aggregate system capacity being scalable without practical upper limit by addition of modules.

24. The method of claim 1, wherein scale-up of the process is achieved by proportional enlargement of reactor diameter, length, slope, and drive parameters to maintain residence-time and temperature profiles consistent with optimal oxidation and product morphology.

* * * * *